United States Patent
Manolakos et al.

(10) Patent No.: US 12,501,390 B2
(45) Date of Patent: Dec. 16, 2025

(54) METHOD AND APPARATUS FOR SELECTION OF BANDS TO MAXIMIZE MEASUREMENTS IN A TUNELESS MEASUREMENT GAP

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US); Guttorm Ringstad Opshaug, Redwood City, CA (US); Fnu Siddhant, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/009,923

(22) PCT Filed: Aug. 5, 2021

(86) PCT No.: PCT/US2021/044831
§ 371 (c)(1),
(2) Date: Dec. 12, 2022

(87) PCT Pub. No.: WO2022/039943
PCT Pub. Date: Feb. 24, 2022

(65) Prior Publication Data
US 2023/0224851 A1 Jul. 13, 2023

(30) Foreign Application Priority Data
Aug. 20, 2020 (IN) ............................. 202021035953

(51) Int. Cl.
*H04W 64/00* (2009.01)
*G01S 5/02* (2010.01)

(52) U.S. Cl.
CPC ........... *H04W 64/00* (2013.01); *G01S 5/0236* (2013.01)

(58) Field of Classification Search
CPC ...... H04W 64/00; G01S 5/0236; H04L 5/001; H04L 5/0048
See application file for complete search history.

(56) References Cited

U.S. PATENT DOCUMENTS 9,860,691 B2 * 1/2018 Siomina ................ G01S 5/0205
10,327,109 B1 6/2019 Maheshwari et al.
(Continued)

FOREIGN PATENT DOCUMENTS

CN 102754468 A 10/2012
CN 104540169 A 4/2015
(Continued)

OTHER PUBLICATIONS

3GPP TS 37.355: "3rd Generation Partnership Project; Technical Specification Group Radio Access Network; LTE Positioning Protocol (LPP) (Release 16)", 3GPP TS 37.355, 3rd Generation Partnership Project, Mobile Competence Centre, 650, Route Des Lucioles, F-06921 Sophia-Antipolis Cedex, France, No. V16.1.0, Jul. 24, 2020 (Jul. 24, 2020), 292 pages, XP051925824, Chapters 4.1.3, 6.5.1.2, Sections 5-5.3.4 and 6.4.2-6.4.3, p. 13, paragraph 1 Scope—p. 104, paragraph 6.5.1.9 OTDOA Error Elements.
(Continued)

*Primary Examiner* — Kabir A Timory
(74) *Attorney, Agent, or Firm* — QUALCOMM Incorporated

(57) ABSTRACT

Techniques are provided for selecting measurement gap periods for positioning user equipment, UE, in 5G NR. A method for positioning a user equipment includes receiving (1302) positioning assistance data associated with one or more frequency layers from a network, determining (1304)
(Continued)

measurement gap information for one or more bands associated with the one or more frequency layers, determining (1306) a number of available positioning reference signals for each of the one or more bands based on the positioning assistance data and the measurement gap information, measuring (1308) one or more positioning reference signals for a selected band, wherein the selected band is based on the number of available positioning reference signals in a measurement gap, and computing (1310) location information based at least in part on one or more positioning reference signal measurements.

40 Claims, 13 Drawing Sheets

(56) References Cited

U.S. PATENT DOCUMENTS

| | | | |
|---|---|---|---|
| 10,660,109 | B2 | 5/2020 | Bitra et al. |
| 2012/0083278 | A1 | 4/2012 | Kazmi et al. |
| 2014/0094188 | A1* | 4/2014 | Kazmi .................. H04W 4/023 |
| | | | 455/456.1 |
| 2017/0311230 | A1* | 10/2017 | Yang ..................... H04L 5/0094 |
| 2019/0124533 | A1 | 4/2019 | Tenny et al. |
| 2020/0021409 | A1 | 1/2020 | Kumar et al. |

FOREIGN PATENT DOCUMENTS

| | | |
|---|---|---|
| CN | 104969641 A | 10/2015 |
| JP | 2014503163 A | 2/2014 |
| JP | 2016054518 A | 4/2016 |
| WO | 2018093835 | 5/2018 |

OTHER PUBLICATIONS

3GPP TS 38.214: "3rd Generation Partnership Project; Technical Specification Group Radio Access Network; NR; Physical Layer Procedures for Data (Release 16)", 3GPP TS 38.214 V16.2.0 (Jun. 2020), Jun. 30, 2020, 3rd Generation Partnership Project, Mobile Competence Centre, 650, Route Des Lucioles, F-06921 Sophia-Antipolis Cedex, France, vol. RAN WG1, No. V16.2.0, Jul. 20, 2020, pp. 1-163, XP051925549, Sections 5.1.6.4-5.1.6.5 and 6.2.1, paragraph [5.1.4.2], paragraph [5.2.2.4]—paragraph [5.2.3], the whole document.

International Search Report and Written Opinion—PCT/US2021/044831—ISA/EPO—Nov. 22, 2021.

Qualcomm Incorporated: "Maintenance on DL Reference Signals for NR Positioning", 3GPP Draft, R1-2004469, 3GPP TSG RAN WG1 #101-e, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886198, pp. 1-5, sections 1, 3 and 5.

Qualcomm Incorporated: "Motivations for Measurement Gap Enhancements WI in NR R17", RP-200999, 3GPP TSG-RAN Plenary Meeting #88-e, 3rd Generation Partnership Project, Mobile Competence Centre, 650, Route Des Lucioles, F-06921 Sophia-Antipolis Cedex, France, vol. TSG RAN, No. Online, Jun. 29, 2020-Jul. 3, 2020, Jun. 2, 22820, XP051903662, pp. 1-6.

Qualcomm Incorporated: "On Impact of NR Positioning on Existing RRM Requirements", 3GPP Draft, R4-2003573, 3GPP TSG-RAN WG4 Meeting #94-e-Bis, 3rd Generation Partnership Project (3GPP), Mobile Competence Centre, 650, Route Des Lucioles, F-06921 Sophia-Antipolis Cedex, France, vol. Ran WG4, No. Online Meeting, Apr. 20, 2020-Apr. 30, 2020, Apr. 10, 2020 (Apr. 10, 2020), XP051875004, pp. 1-9, sections 1-6.

Qualcomm Incorporated: "On New MG Patterns for NR Positioning", 3GPP Draft, R4-2009879, 3GPP TSG-RAN WG4 Meeting #96-e, 3rd Generation Partnership Project (3GPP), Mobile Competence Centre, 650, Route Des Lucioles, F-06921 Sophia-Antipolis Cedex, France, vol. RAN WG4, No. Online, Aug. 17, 2020-Aug. 28, 2020, Aug. 7, 2020 (Aug. 7, 2020), XP051912954, pp. 1-8, sections 1-3.

Qualcomm Inc: "On Impact of NR Positioning on Existing RRM Requirements", R4-2003573, 3GPP TSG-RAN WG4 Meeting #94-e-Bis Online, Apr. 20-30, 2020, pp. 1-9.

* cited by examiner

METHOD AND APPARATUS FOR SELECTION OF BANDS TO MAXIMIZE MEASUREMENTS IN A TUNELESS MEASUREMENT GAP

CROSS-REFERENCE TO RELATED APPLICATIONS

This application is the National Stage of International Application No. PCT/US2021/44831, filed Aug. 5, 2021, entitled "SELECTION OF BANDS TO MAXIMIZE TUNELESS GAP MEASUREMENTS," which claims the benefit of Indian Patent Application number 202021035953, filed Aug. 20, 2020, entitled "SELECTION OF BANDS TO MAXIMIZE TUNELESS GAP MEASUREMENTS," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Improvements in the timing and detection of reference signals may be used to increase positioning accuracy and reduce power consumption in a mobile device.

SUMMARY

An example method for positioning a user equipment according to the disclosure includes receiving positioning assistance data associated with one or more frequency layers from a network, determining measurement gap information for one or more bands associated with the one or more frequency layers, determining a number of available positioning reference signals for each of the one or more bands based on the positioning assistance data and the measurement gap information, measuring one or more positioning reference signals for a selected band, wherein the selected band is based on the number of available positioning reference signals in a measurement gap, and computing location information based at least in part on one or more positioning reference signal measurements.

Implementations of such a method may include one or more of the following features. Determining the measurement gap information may include determining a tune in duration and a tune out duration for the measurement gap. The selected band may be a band to which the user equipment does not need to tune in or tune out whereby the measurement gap is a tuneless measurement gap and the tune in duration and the tune out duration are zero. At least one of the one or more bands may be associated with an active bandwidth part on the user equipment. The one or more bands may include a first component carrier in a first band and a second component carrier in a second band. The first band and the second band may be in a first frequency layer. The first band may be in a first frequency layer and the second band may be in a second frequency layer. The one or more bands may include a first component carrier and a second component carrier in a first band. The selected band may be determined so as to maximize a number of positioning reference signals that may be measured in one or more component carriers in the measurement gap. The number of positioning reference signals that may be measured may include those in an actual gap less any tune in or tune out period for the user equipment. The one or more frequency layers may include a first frequency layer in a range of 410-7125 MHZ, or a second frequency layer in a range of 24.25-52.6 GHz. At least one of the one or more frequency layers may be configured to operate in a frequency range above 100 GHz. Determining the measurement gap information may include requesting the measurement gap information from a base station. At least one of the one or more positioning reference signals may be a beamformed positioning reference signal. The one or more positioning reference signals may include at least two positioning reference signals transmitted in the same frequency layer. The one or more positioning reference signals may include a first positioning reference signal transmitted in a first frequency layer and a second positioning reference signal transmitted in a second frequency layer. The selected band may be based on the number of available positioning reference signals in a combination of measurement gaps in the one or more bands. Determining the measurement gap information may include requesting the measurement gap information from a base station and receiving the measurement gap information from the base station. Requesting the measurement gap information may be based on radio resource control (RRC) messaging.

An example apparatus according to the disclosure includes a memory, at least one transceiver, at least one processor communicatively coupled to the memory and the at least one processor and configured to receive positioning assistance data associated with one or more frequency layers from a network, determine measurement gap information for one or more bands associated with the one or more frequency layers, determine a number of available positioning reference signals for each of the one or more bands based on the positioning assistance data and the measurement gap information, measure one or more positioning reference signals for a selected band, wherein the selected band is based on the number of available positioning reference signals in a measurement gap, and compute location information based at least in part on one or more positioning reference signal measurements.

Implementations of such an apparatus may include one or more of the following features. The at least one processor may be further configured to determine a tune in duration and a tune out duration for the measurement gap. The at least one processor may be further configured to select a band which does not need to tune in or tune out whereby the measurement gap is a tuneless measurement gap and the tune in duration and the tune out duration are zero. At least one of the one or more bands may be associated with an active bandwidth part on the apparatus. The one or more bands may include a first component carrier in a first band and a second component carrier in a second band. The first band and the second band may be in a first frequency layer. The first band may be in a first frequency layer and the second band may be in a second frequency layer. The or more bands may include a first component carrier and a second component carrier in a first band. The at least one processor may be further configured to select a band so as to maximize a number of positioning reference signals that may be measured in one or more component carriers in the measurement gap. The number of positioning reference signals that may be measured may include those in an actual gap less any tune in or tune out period. The one or more frequency layers may include a first frequency layer in a range of 410-7125 MHZ, or a second frequency layer in a range of 24.25-52.6 GHz. At least one of the one or more frequency layers may be configured to operate in a frequency range above 100 GHz. The at least one processor may be configured to request the measurement gap information from a base station. At least one of the one or more positioning reference signals may be a beamformed positioning reference signal. The one or more positioning reference signals may include at least two positioning reference signals transmitted in the same frequency layer. The one or more positioning reference signals may include a first positioning reference signal transmitted in a first frequency layer and a second positioning reference signal transmitted in a second frequency layer. The selected band may be based on the number of available positioning reference signals in a combination of measurement gaps in the one or more bands. The at least one processor may be further configured to request the measurement gap information from a base station and receive the measurement gap information from the base station. The measurement gap information request may be based on radio resource control (RRC) messaging.

An example apparatus for positioning a user equipment according to the disclosure includes means for receiving positioning assistance data associated with one or more frequency layers from a network, means for determining measurement gap information for one or more bands associated with the one or more frequency layers, means for determining a number of available positioning reference signals for each of the one or more bands based on the positioning assistance data and the measurement gap information, means for measuring one or more positioning reference signals for a selected band, wherein the selected band is based on the number of available positioning reference signals in a measurement gap, and means for computing location information based at least in part on one or more positioning reference signal measurements.

An example non-transitory processor-readable storage medium comprising processor-readable instructions configured to cause one or more processors to position a user equipment according to the disclosure includes code for receiving positioning assistance data associated with one or more frequency layers from a network, code for determining measurement gap information for one or more bands associated with the one or more frequency layers, code for determining a number of available positioning reference signals for each of the one or more bands based on the positioning assistance data and the measurement gap information, code for measuring one or more positioning reference signals for a selected band, wherein the selected band is based on the number of available positioning reference signals in a measurement gap, and code for computing location information based at least in part on one or more positioning reference signal measurements.

Items and/or techniques described herein may provide one or more of the following capabilities, as well as other capabilities not mentioned. A user equipment may determine positioning reference signal transmission schedules for one or more base stations operating on one or more frequency layers. The user equipment may request measurement gap information from the base stations. The measurement gap information may be associated with a band in a frequency layer. The measurement gaps maybe be tuneless measurement gaps based on the configuration of the user equipment. For example, the user equipment may be configured with one or more active bandwidth parts. The user equipment may determine how many positioning reference signals will be transmitted in a measurement gap. Measurement gaps, or combinations of measurement gaps, may be selected based on the number of available positioning reference signals. Tuneless measurement gaps may be favored based on the elimination of the tune in and tune out periods. Reference signal symbol loss may be reduced. Positioning accuracy may be improved. Other capabilities may be provided and not every implementation according to the disclosure must provide any, let alone all, of the capabilities discussed.

DETAILED DESCRIPTION

Techniques are discussed herein for selecting measurement gap periods for positioning user equipment (UE) in 5G NR. Base stations may be configured to transmit reference signals, such as positioning reference signals (PRS), in one or more bands. The bands may be in different frequency layers and may include different component carriers. A UE may operate within an active bandwidth part (BWP) in an active component carrier (CC) and may receive PRS configurations from a location server. The UE may also receive measurement gap information for the different bands from the base station. The UE may determine how many PRSs may be received during the measurement gaps for each of the different bands. The durations of the measurement gaps may be reduced based on tune in and tune out times (i.e., the tuning time required for the UE to retune to a different band). A measurement gap that is within the current active BWP may not require retuning (i.e., it is a tuneless measurement gap). The UE may be unable to receive PRSs transmitted during the tuning periods in different bands. The UE may select the bands, or combinations of bands, with the highest number of available PRSs to measure. The UE may report the positioning measurements based on the received PRS, and a location may be derived based on the positioning measurements. These techniques and configurations are examples, and other techniques and configurations may be used.

Figure 1:
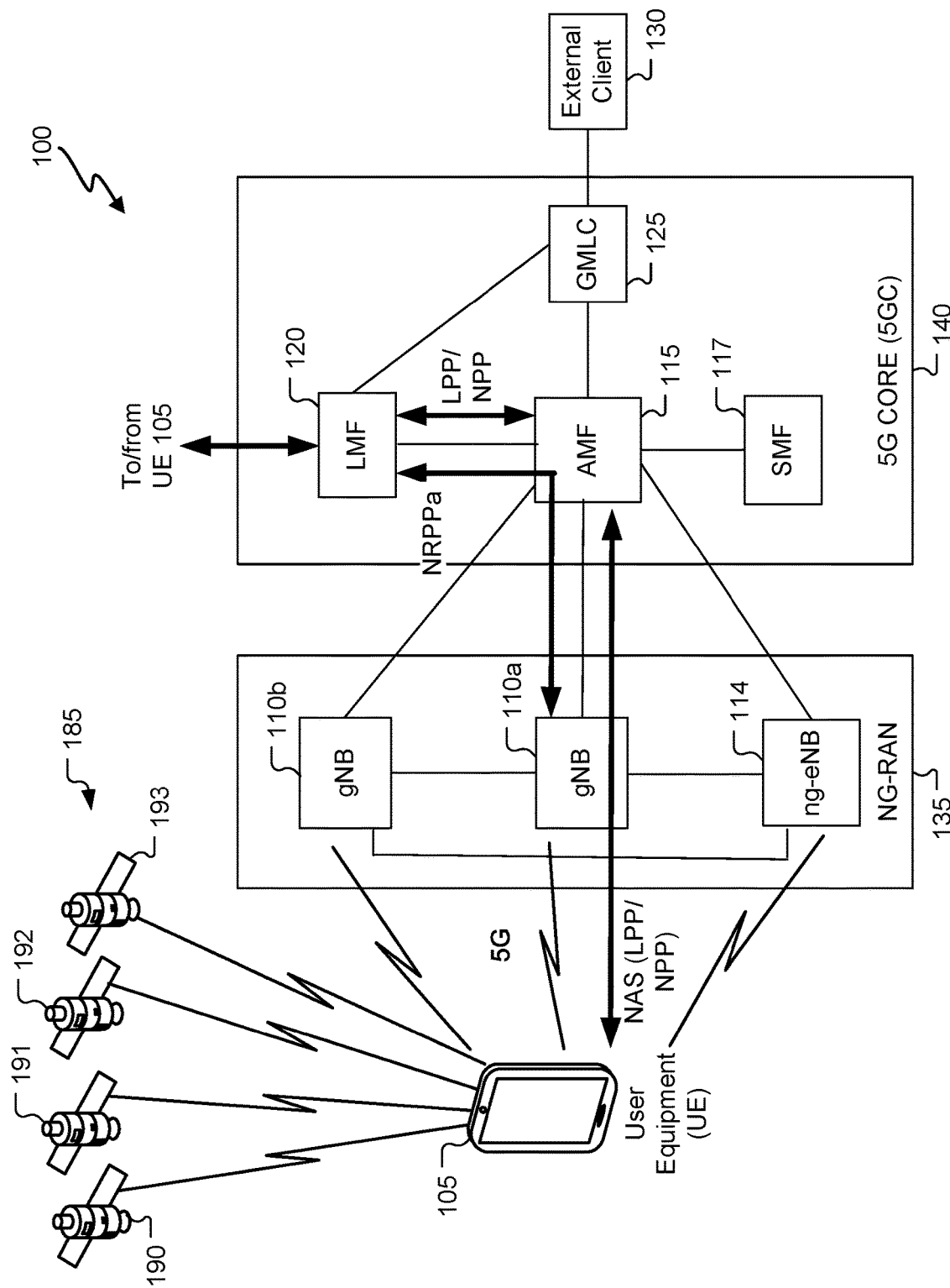
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network: NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth R (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth R, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs (e.g., the gNB 110a, gNB 110b, ng-eNB 114) may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*. 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
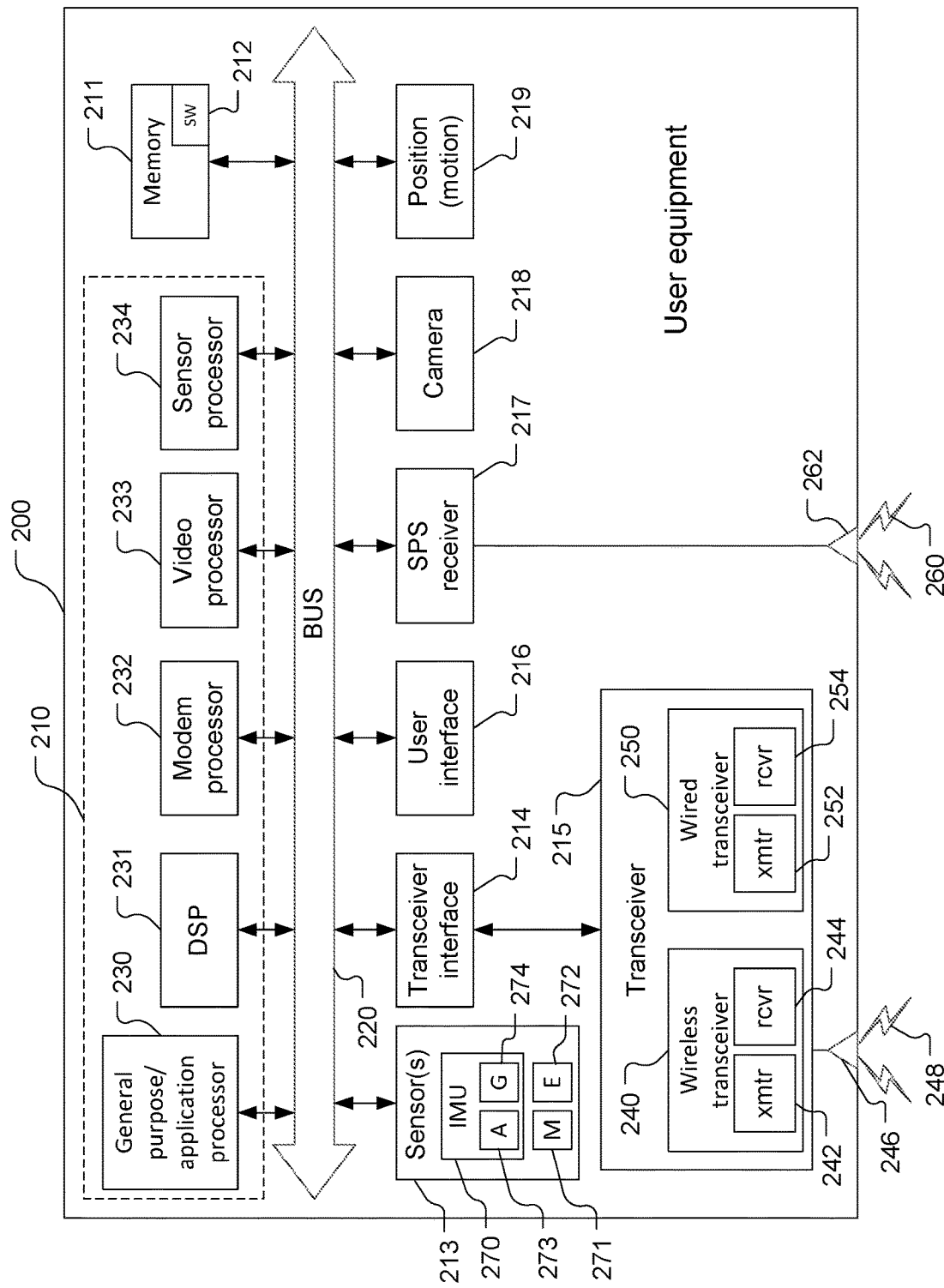
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM) and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-everything (V2X) (PC5), V2C (Uu), IEEE 802.11 (including IEEE 802.11p), WiFi, WiFi Direct (WiFi-D), Bluetooth R, Zigbee etc. NR systems may be configured to operate on different frequency layers such as FR1 (e.g., 410-7125 MHz) and FR2 (e.g., 24.25-52.6 GHZ), and may extend into new bands such as sub-6 GHZ and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
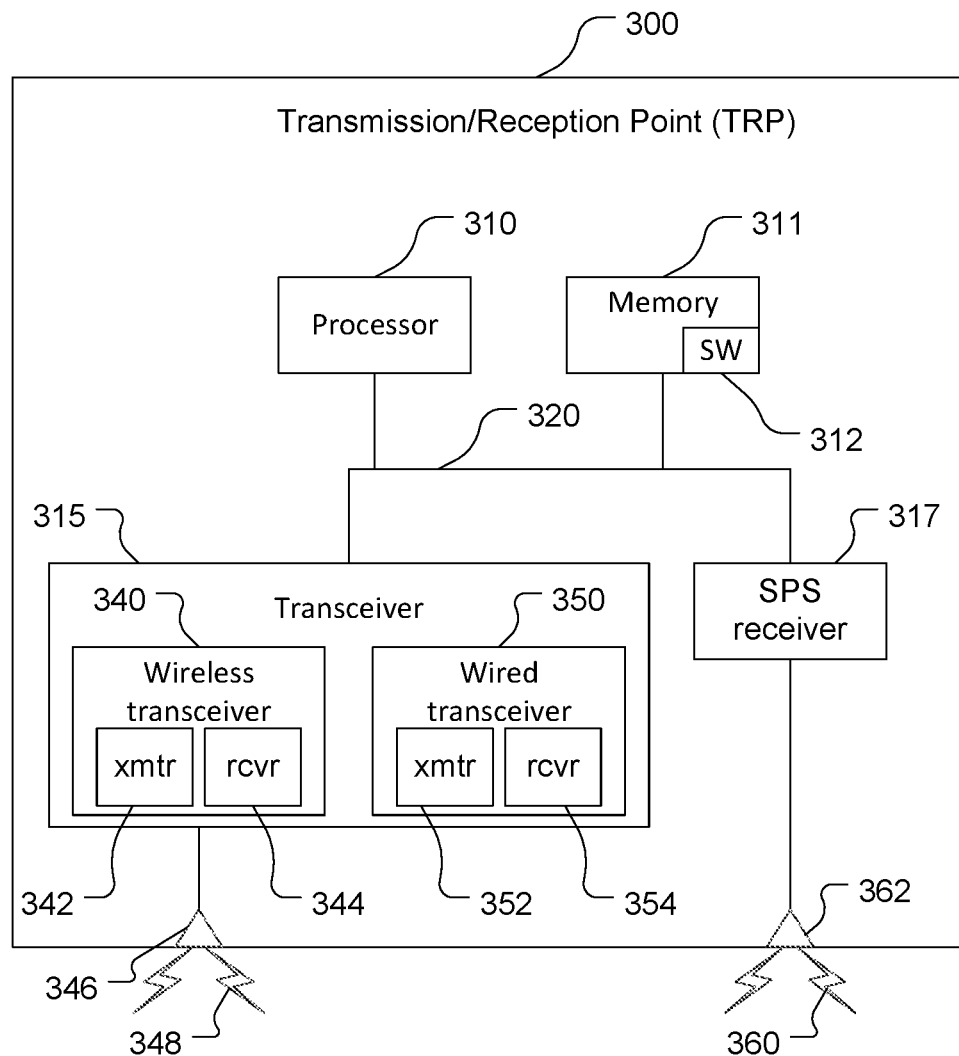
FIG. 3 is a block diagram of components of an example transmission/reception point shown in FIG. 1.

Referring also to FIG. 3, an example of a TRP 300 of the BSs, such as the gNB 110a, gNB 110b, ng-eNB 114, comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth R, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
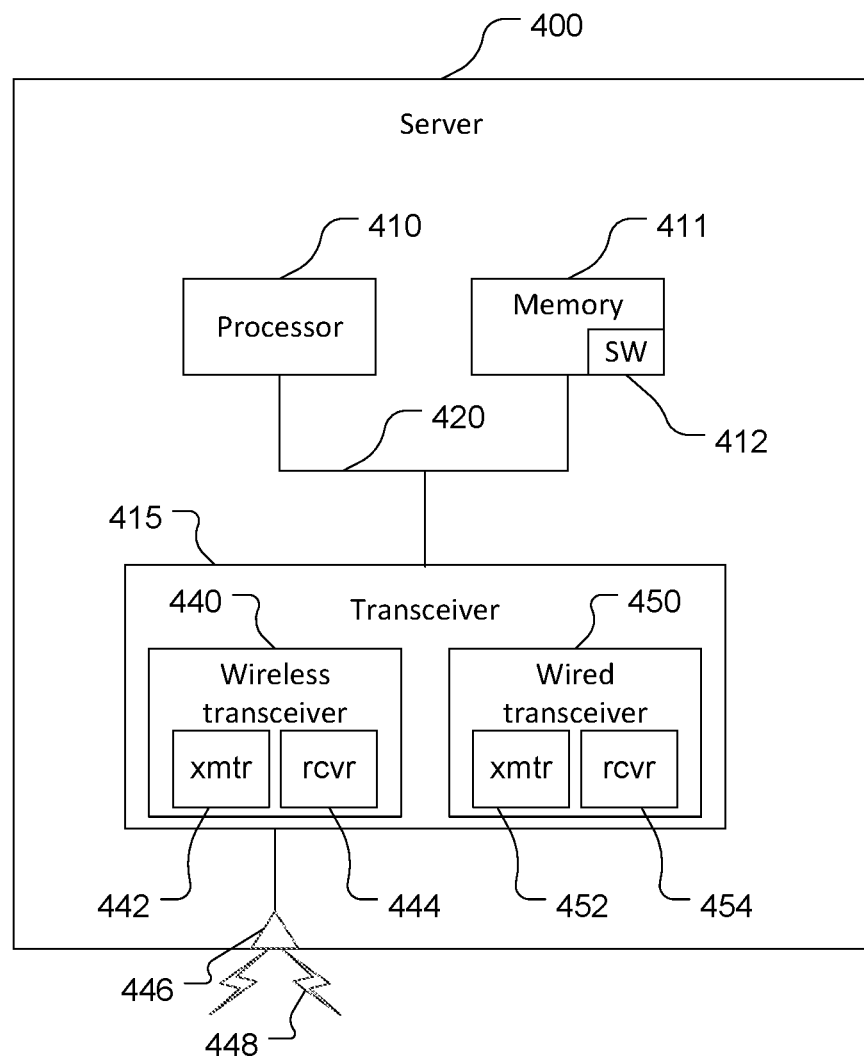
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth R, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
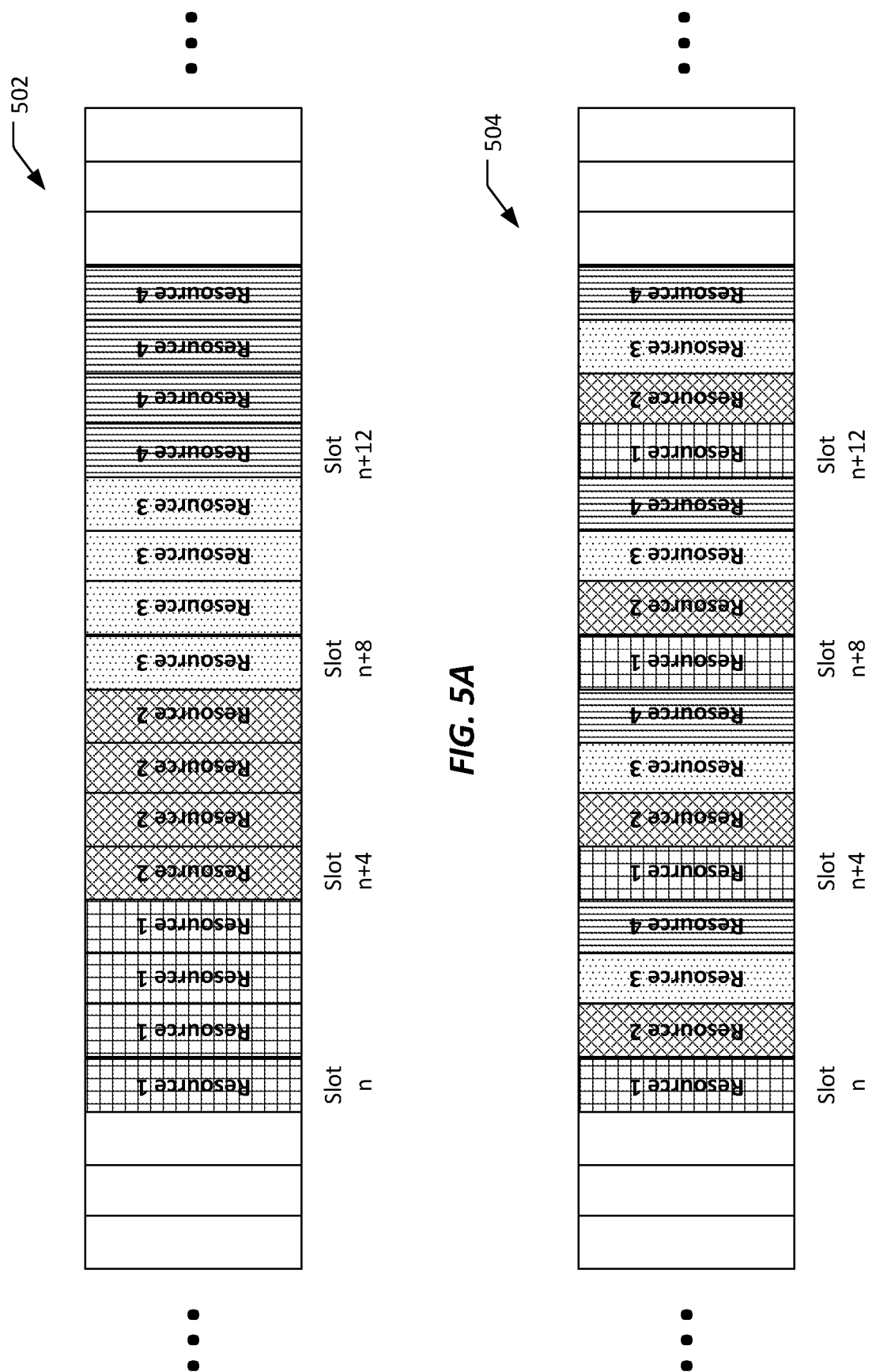
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
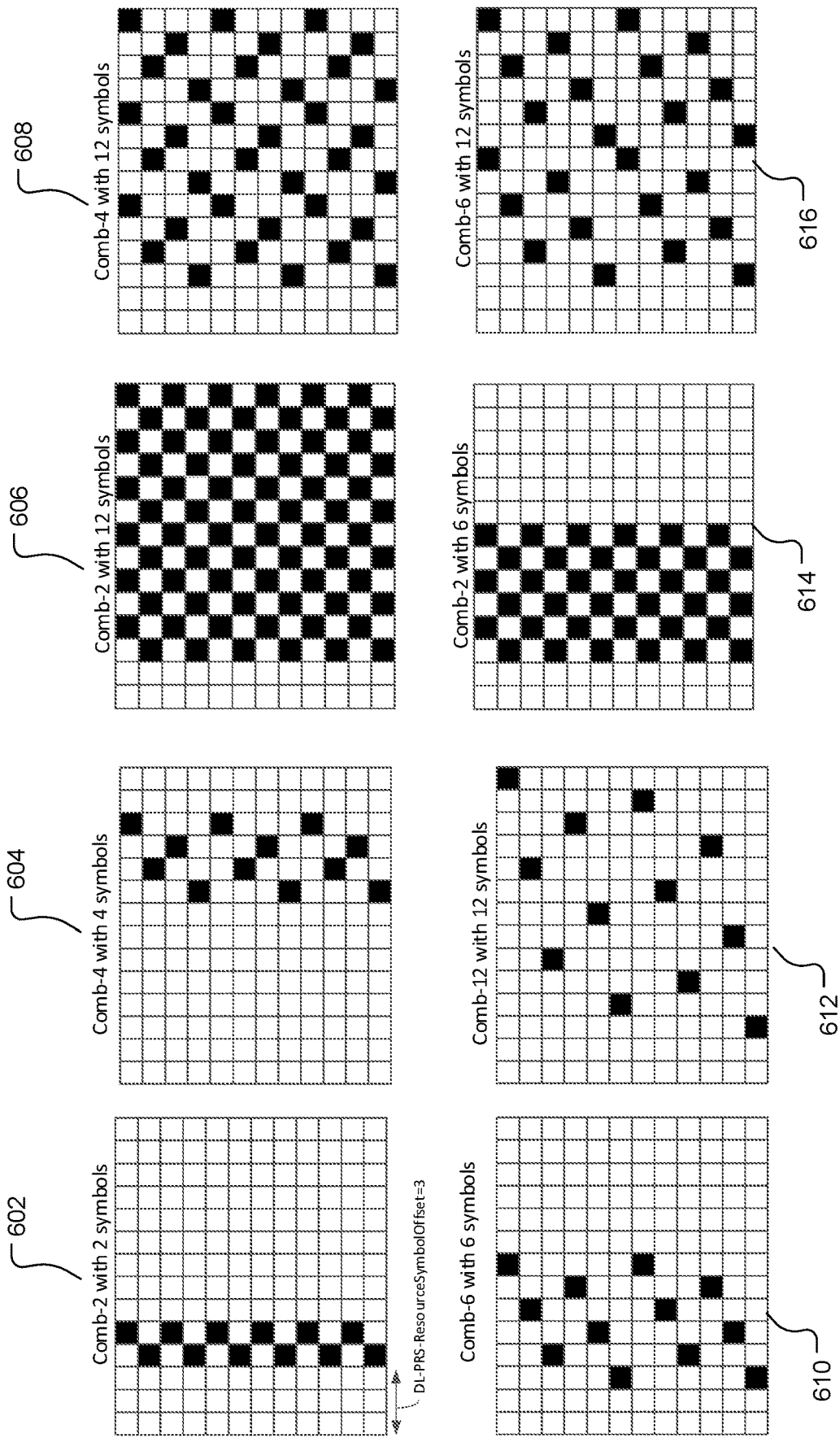
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

In an example, a positioning frequency layer may be a collection of PRS resource sets across one or more base stations. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS.

A PRS occasion is one instance of a periodically repeated time window (e.g., a group of one or more consecutive slots) where PRS are expected to be transmitted. A PRS occasion may also be referred to as a PRS positioning occasion, a positioning occasion, or simply an occasion.

Note that the terms positioning reference signal and PRS are reference signals that can be used for positioning, such as but not limited to, PRS signals in LTE, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 7:
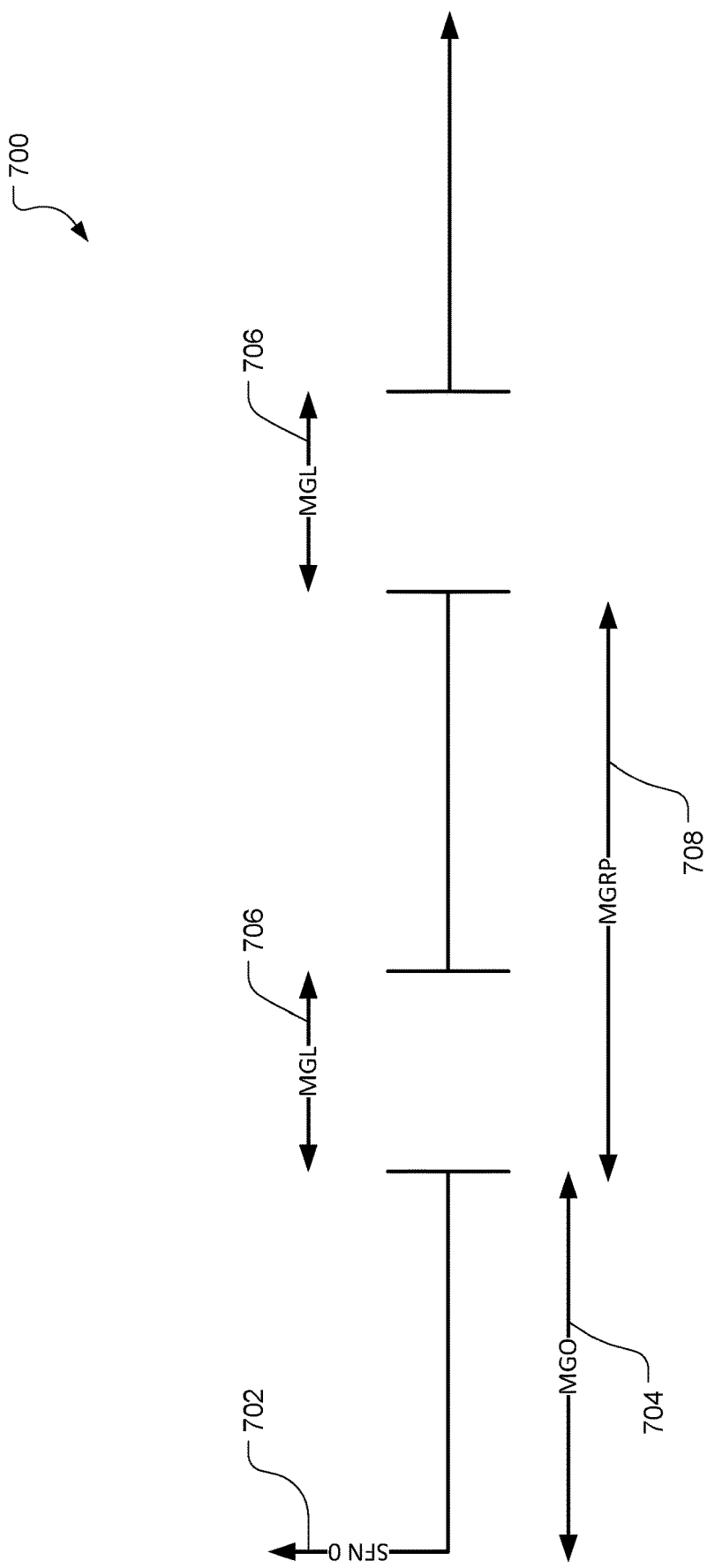
FIG. 7 is a timing diagram of an example measurement gap.

Referring to FIG. 7, a timing diagram 700 of an example measurement gap is shown. Measurement gaps may be used by the UE 200 to perform measurements which cannot be accomplished while the UE 200 is communicating with a serving cell. During the measurement gap, the uplink and downlink data transfers are interrupted. The UE 200 may use the measurement gaps for PRS and RRM measurements. In LTE systems, the measurement gaps may be used for inter-frequency and inter-system measurements. The measurement gaps provide additional time to allow the UE 200 to re-tune its transceiver to the target band (e.g., carrier), obtain measurements, and then re-tune the transceiver back to the original carrier. The re-tuning operations may require up to 0.5 ms. In NR systems, the measurement gaps may be used for intra-frequency measurements, in addition to inter-frequency and inter-system measurements. A NR UE may be configured to utilize bandwidth parts (BWPs). In an example, the UE may be configured with an active BWP which does not contain the intra-frequency SS/PBCH block, and the UE may have to re-tune its transceiver to receive the intra-frequency SS/PBCH block. A base station, such as the gNBs 110a-b and the ng-eNB 114, may be configured to generate and provide measurement gap information to the UEs. For example, the base station may transmit measurement gap configuration information elements such as a measurement gap offset (MGO) 704 which can be measured from a frame or subframe boundary 702. A measurement gap length (MGL) 706 indicates the duration of a measurement gap. The MGL 706 is typically in a range of 1.5 to 6 ms. The measurement gap repetition period (MGRP) 708 defines the period between consecutive measurement gaps. 3GPP TS 38.133 specifies gap patterns based on combinations of the MGL 706 and the MGRP 708. For example, the MGL 706 values may vary from 1.5 to 6 ms, and the MGRP 708 values may vary from 20 to 160 ms. The MGL 706 may be further limited to accommodate UE tuning times. The measurement gap information may be exchanged via Radio Resource Control (RRC) signaling, or via other network interfaces.

Figure 8A:
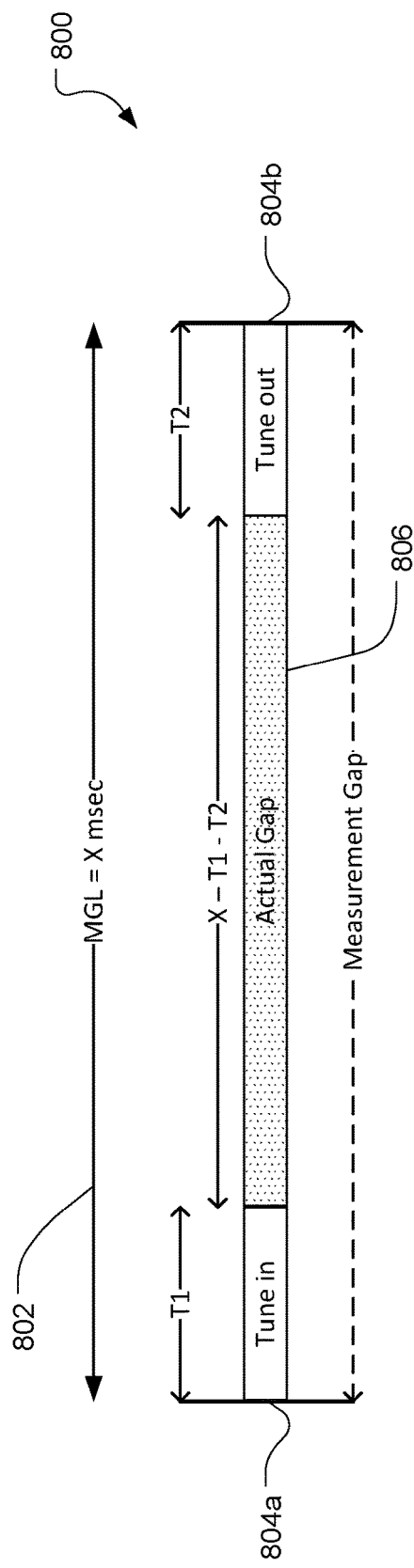
FIG. 8A is an illustration of an example tune on measurement gap with tune in and tune out periods.

Referring to FIG. 8A, an illustration of an example tune on measurement gap 800 with tune in and tune out periods is shown. The tune on measurement gap 800 has a MGL 802 which also includes a tune in period 804a and a tune out period 804b. As used herein, the term tune on means a measurement gap with tuning periods (e.g., the tune in period 804a and the tune out period 804b), as opposed to a tuneless measurement gap (e.g., without tuning periods). The MGL 802 is an example of the MGL 706 in FIG. 7. In general, if the MGL 802 equal X ms, and the tune period 804a-b are T1 and T2 ms, respectively, then an actual gap length 806 is equal to X−T1−T2 as depicted in FIG. 8A. The tuning periods 804a-b are typically in the range of 250-500 microseconds (µs) and are configured to enable the UE 200 to re-tune transceivers to a new band to obtain PRS or RRM measurements during the measurement gap, and then tune back to the previous band. In some cases, the UE 200 may be tuned to the same band as the PRS transmission and may utilize a tuneless measurement gap to obtain the measurements. For example, referring to FIG. 8B, a tuneless measurement gap 850 is shown. The tuneless measurement gap 850 may have the same MGL 802 as the tune on measurement gap 800, but an actual gap 808 may be larger because of the elimination of the tuning periods 804*a-b*. The UE 200 may be configured to measure PRS and RRM signals within the duration of the actual gap 808.

Figure 9:
FIG. 9 is a data table indicating example symbol losses during tuning periods.

Signal timing issues may arise based on the scheduling of PRS transmissions, which are defined in a network server such as the LMF 120, and the measurement gaps which are determined by the base station (e.g., a gNB 110*a*). For example, PRS transmissions may be scheduled during a period that is within the tuning periods 804*a-b*. The UE 200 may not be able to measure signals while retuning and therefore may not be able to measure reference signals transmitted in the tune in and tune out periods 804*a-b*. The tuning and bandwidth capabilities of UE's may vary and some UE's may be capable of retuning faster than others. Such fast tuning UEs may be able to measure some reference signals transmitted during the tuning periods 804*a-b*. The inability for UEs to receive PRSs during the tuning periods 804*a-b*, and the corresponding increase in symbols lost, may reduce the accuracy of the resulting position estimates. For example, referring to FIG. 9, a data table 900 indicating example symbol losses during tuning periods is shown. The data table 900 includes numerology parameters and the estimated symbol losses for different subcarrier spacing values. The loss of symbols may impact the ability of a UE to effectively measure reference signals for positioning and mobility applications.

Figure 8B:
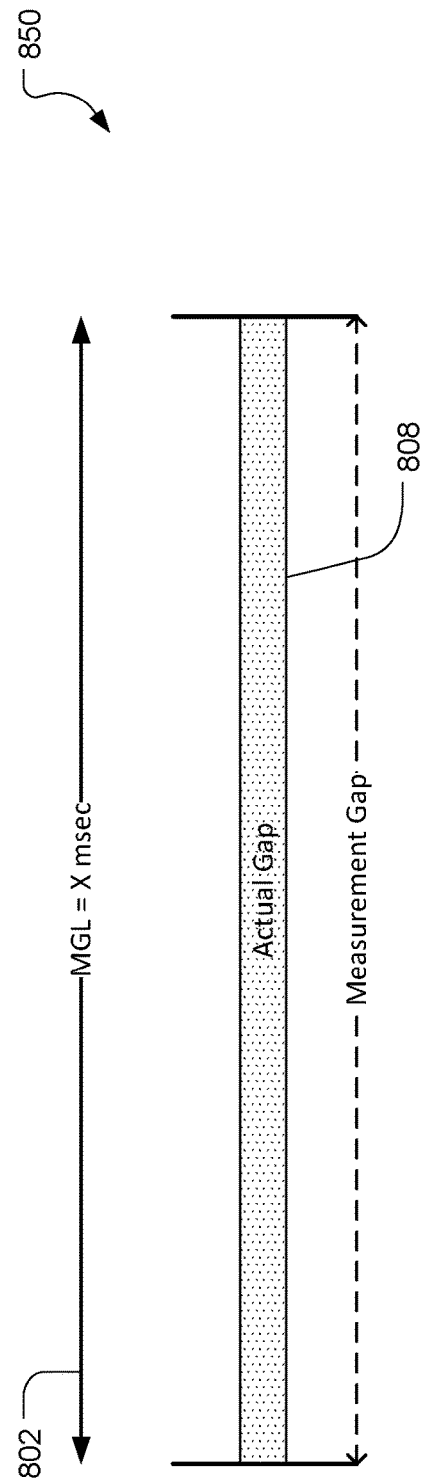
FIG. 8B is an illustration of an example tuneless measurement gap.
Figure 10:
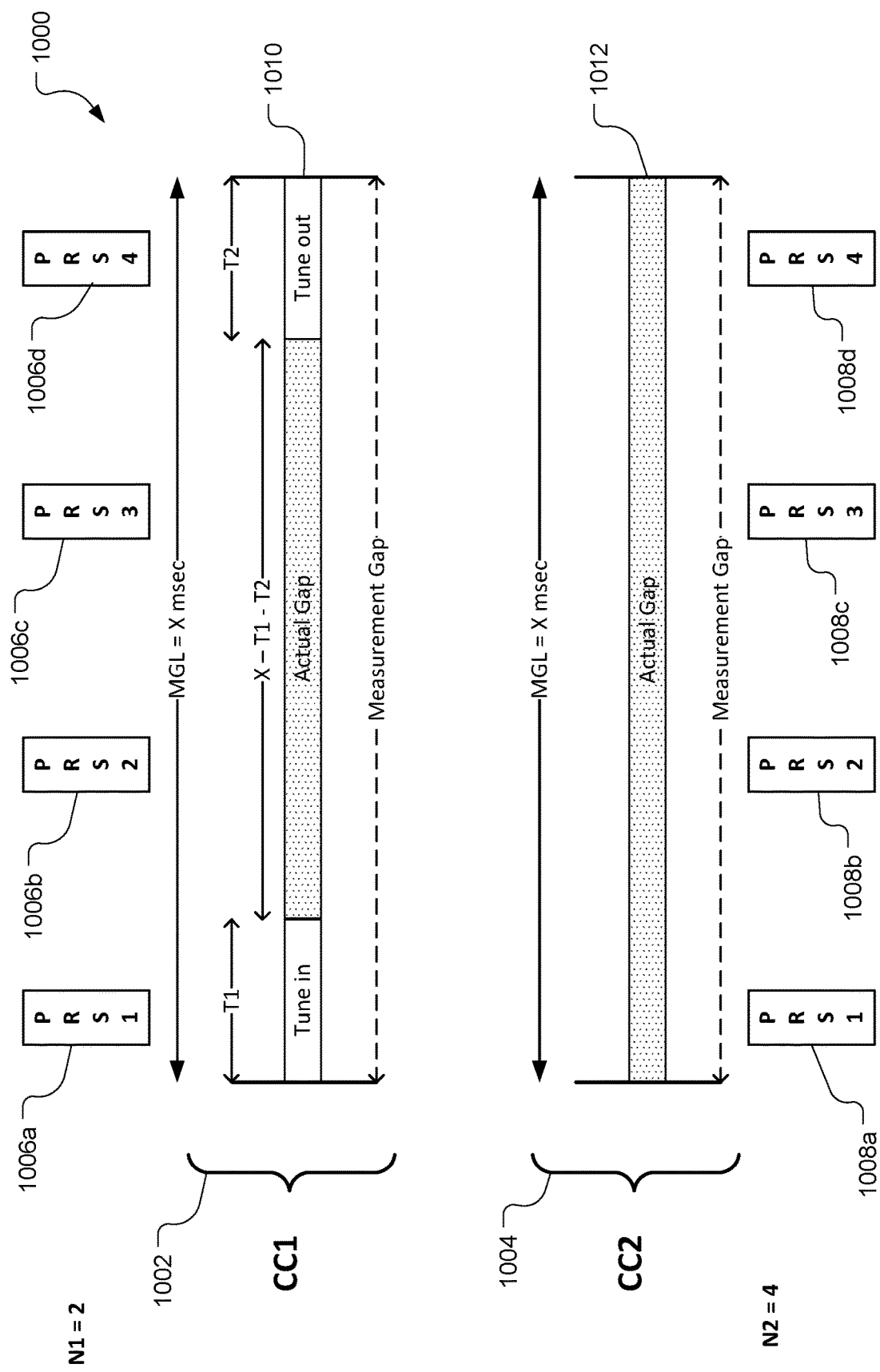
FIG. 10 is a first example timing diagram of positioning reference signals transmitted on two bands.

Referring to FIG. 10, with further reference to FIGS. 8A and 8B, a first example timing diagram 1000 of positioning reference signals transmitted on two bands is shown. The timing diagram 1000 includes a PRS transmitted during measurement gaps on a first band (e.g., a first component carrier) 1002 and on a second band (e.g., a second component carrier) 1004. The first band 1002 includes four PRS transmissions including a first PRS 1006*a*, a second PRS 1006*b*, a third PRS 1006*c*, and a fourth PRS 1006*d*. A first measurement gap 1010 is an example of a tune on measurement gap 800 and includes tuning time periods T1 and T2 as previously described, and the first PRS 1006*a* occurs during a tune in period T1 and the fourth PRS 1006*d* occurs during the tune out period T2. A UE may not be able to receive the first and fourth PRS 1006*a*. 1006*d* because of retuning requirements. Thus, a number 'N' of available PRS is 2 (i.e., N1=2). In contrast, the second band 1004 includes four PRS transmissions including a first PRS 1008*a*, a second PRS 1008*b*, a third PRS 1008*c*, and a fourth PRS 1008*d*. A second measurement gap 1012 is an example of a tuneless measurement gap 850 and the UE may receive all four PRS transmissions during the measurement gap period (i.e., N2=4). In an example, a UE may be utilizing an active BWP in the second band 1004 prior to the measurement gap and thus may determine that the second measurement gap 1012 is a tuneless measurement gap. That is, the UE does not need to retune to measure the PRS transmissions. A UE on the second band 1004, however, may have to retune to receive the second PRS 1006*b* and the third PRS 1006*c* on the first band 1002.

The UE 200 may be configured to determine the available PRS resources based on received assistance data and correlate the available PRS with the measurement gap configuration received from a serving cell. A UE may receive assistance data for positioning from the LMF 120 which may contain one or more positioning frequency layers. Each layer may have a number 'N' TRPs or 'N' PRS resources or 'N' PRS resource sets or 'N' beams. In an example, a UE may be currently operating in a 3 carrier aggregation (CA) configuration such that each carrier the UE is associated with an active BWP. Each BWP may have different SCS or CP or bandwidth occupancy. The LMF 120 may configure the PRS without knowledge of the measurement gaps the UE may request, or the corresponding tune in and tune out periods. Thus, it is likely that at least a portion of the PRS will be transmitted within the tune in or tune out periods. The UE 200 may be configured to characterize tune on and tuneless measurement gaps based on the current state of the UE 200. For example, a tuneless measurement gap may be on a carrier that is in the active BWP configured on the UE. The UE 200 may be configured to select a measurement gap and band based on the number or PRS that may be received. For example, referring to FIG. 10, the UE 200 may choose to receive the PRS on the second band 1004 because it can receive all four PRS 1008*a-d*, rather than attempt to receive two PRS (i.e., the second and third PRS 1006*b-c*) on the first band 1002. The relationship of the PRS transmission times to the measurement gaps, however, may vary and is some examples more reference signals may be measurable in a tune on measurement gap as compared to a tuneless measurement gap.

Figure 11:
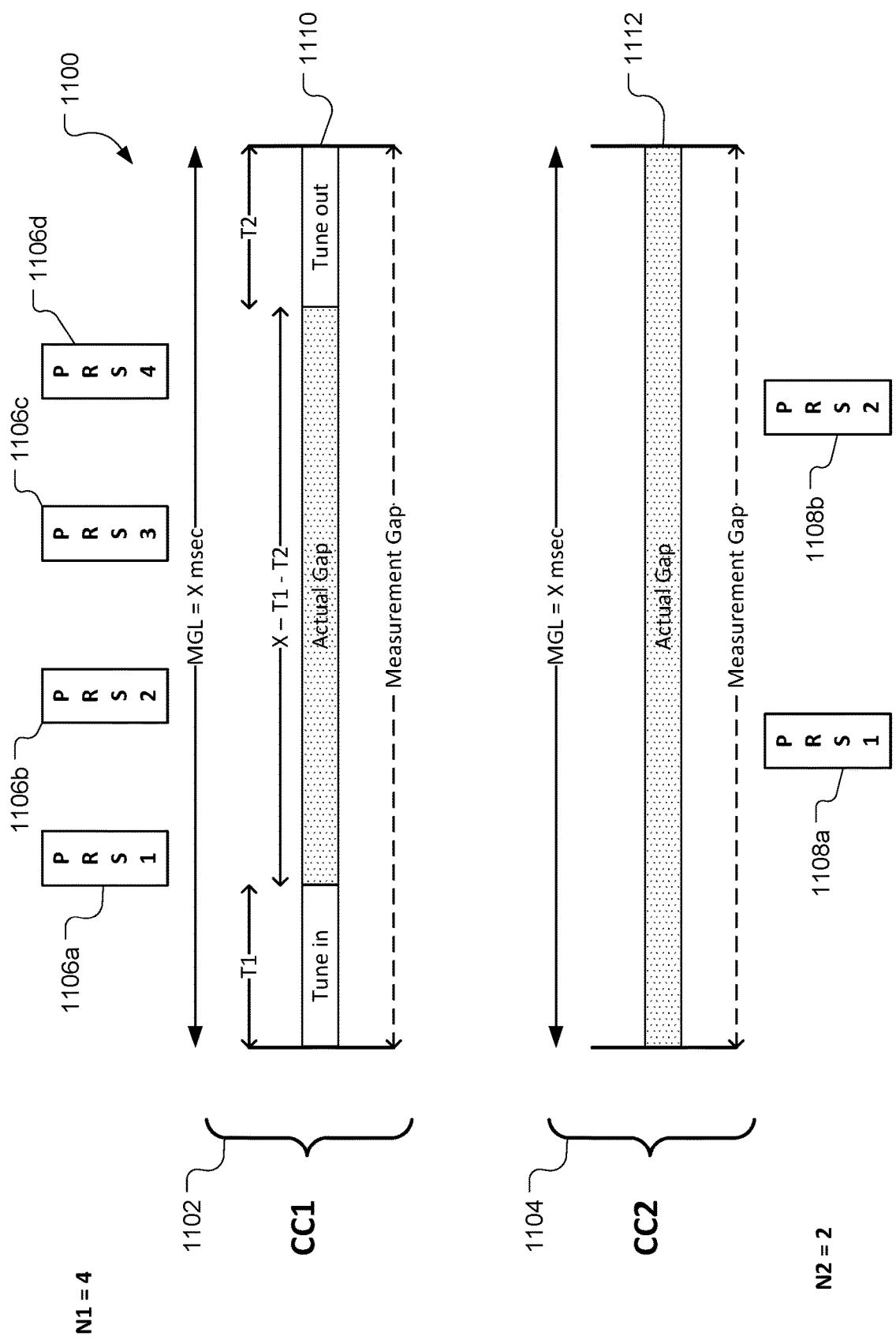
FIG. 11 is a second example timing diagram of positioning reference signals transmitted on two bands.

Referring to FIG. 11, with further reference to FIGS. 8A and 8B, a second example timing diagram 1100 of positioning reference signals transmitted in two bands is shown. The timing diagram 1100 includes PRS transmitted during measurement gaps on a first band (e.g., a first component carrier) 1102 and on a second band (e.g., a second component carrier) 1104. The first band 1102 includes four PRS transmissions including a first PRS 1106*a*, a second PRS 1106*b*, a third PRS 1106*c*, and a fourth PRS 1106*d*. A first measurement gap 1110 is an example of a tune on measurement gap 800 and includes tuning time periods T1 and T2 as previously described. In this example, the four PRS 1106*a-d* are transmitted within the actual gap period and do not overlap with tune in and tune out periods T1, T2 and thus the number of available PRS is 4 (i.e., N1=4). The second band 1104 includes two PRS transmissions including a first PRS 1108*a*, and a second PRS 1108*b*. A second measurement gap 1112 is an example of a tuneless measurement gap 850. In this example, since two PRS transmissions are available during the measurement gap on the second band 1104 (i.e., N2=2), a UE may retune to the first band 1102 to attempt to receive the four PRS 1106*a-d* rather than remain on the second band 1104 and receive the two available PRS 1108*a-b*. The UE 200 is configured to determine the number 'N' of available measurable PRS on a band, which may exclude PRS in tuning periods, and then select a band to increase the number of PRS to measure. FIG. 11 illustrates an example where a tune on measurement gap may be given priority over a tuneless measurement gap. Since the PRS are typically configured by the LMF 120 without prior knowledge of measurement gap configurations, other variations of PRS timing relative to measurement gaps on different frequency layers may also occur. The UE 200 may be configured to request the measurement gaps in a band which will maximize the number of PRS resources to be measured. For example, the UE 200 may utilize RRC or other network signaling to request measurement gaps from the base stations (e.g., see 3GPP 38.305, rev. 16, sec. 7.4.1.1).

Figure 12:
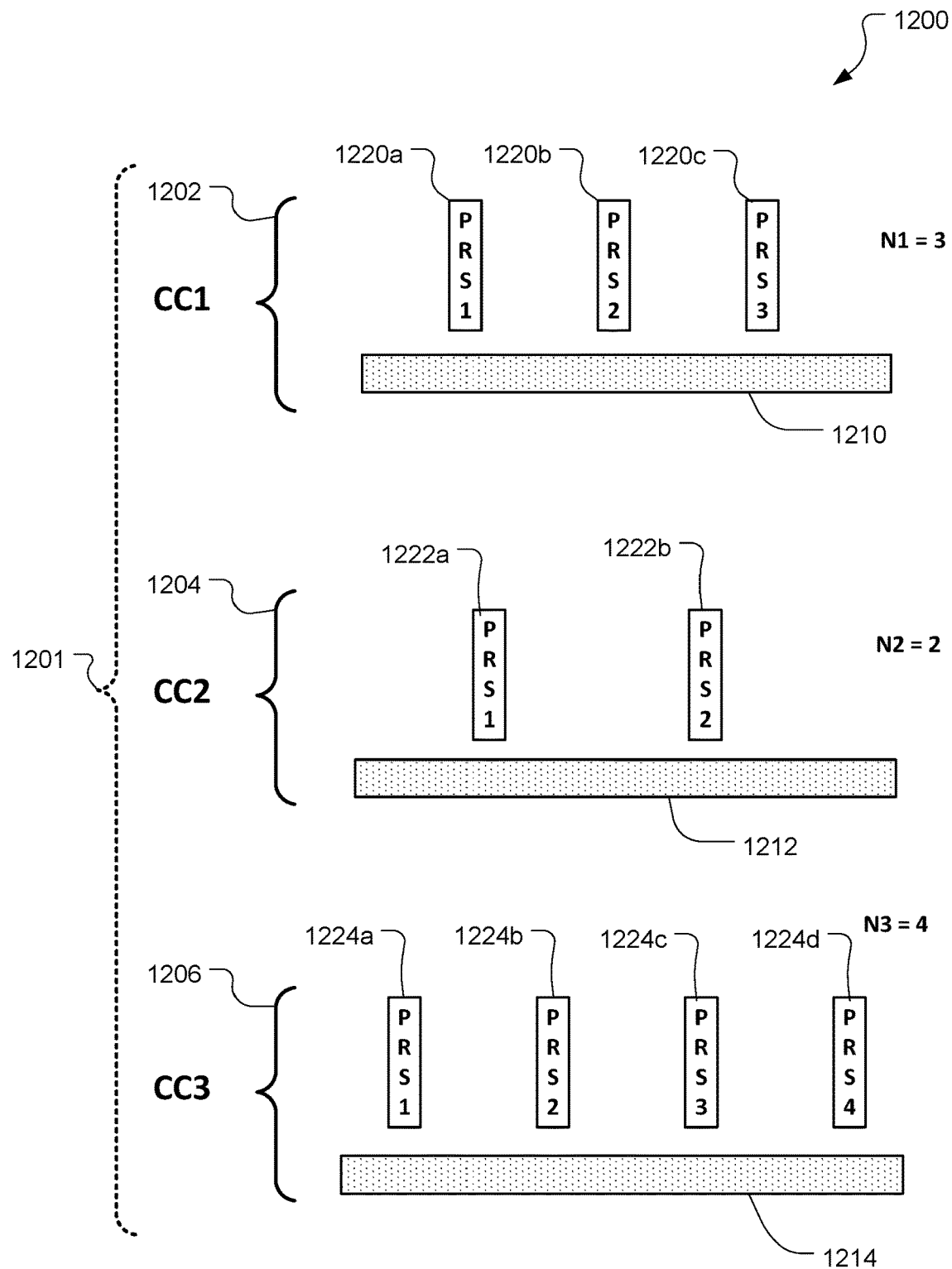
FIG. 12 is an example timing diagram of positioning reference signals transmitted on three bands.

Referring to FIG. 12, an example timing diagram 1200 of positioning reference signals transmitted on three bands is shown. In an example, the UE 200 may be configured to operate in a carrier aggregation scheme with multiple component carriers (CC) in one or more bands. The UE 200 may be configured to determine how many TRPs, PRS resources, PRS resource sets, and/or beams that can be measured during a measurement gap without having to tune in and tune out. In operation, the UE 200 may not need to tune in or tune out for PRSs which are configured within the active BWP of a configured CC. The UE 200 may be operating on a first component carrier 1202, a second component carrier 1204, and a third component carrier 1206. In an example, the component carriers 1202, 1204, 1206 may be within the same band 1201. The band 1201 may be within a portion of a frequency layer. In another example, the component carriers 1202, 1204, 1206 may be in different bands and/or different frequency layers. Each of the component carriers 1202, 1204, 1206 is associated with an active BWP and the UE 200 may request respective tuneless measurement gaps including a first measurement gap 1210, a second measurement gap 1212, and a third measurement gap 1214. The UE 200 may determine a number ('N') of PRSs that may be measured on each of the component carriers. For example, three PRSs 1220a-c may be received during the first measurement gap 1210 on the first component carrier 1202 and thus a first number N1 equals 3. Two PRSs 1222a-b may be received during the second measurement gap 1212 on the second component carrier 1204 and thus a second number N2 equals 2. Four PRSs 1224a-d may be received during the third measurement gap 1214 on the third component carrier 1206 and thus a third number N3 equals 4. The number of PRSs and durations of the measurement gaps are examples as different bands, TRPs, PRS resources, PRS resource sets, and/or beams and measurement gaps may be used and thus the number of PRSs available to the UE 200 to measure may vary.

The UE 200 may be configured to select one or more of the component carriers 1202, 1204, 1206 which will maximize the number of PRS that can be measured during one or more measurement gaps. In an embodiment, the UE 200 may be configured to select one measurement gap and select the maximum of N1, N2, and N3. In this example, the max(N1, N2, N3) is equal to 4. In an embodiment, the UE 200 may be configured to determine a maximum number based on a combination of more than one component carrier. For example, the UE 200 may be configured to determine the maximum of N1+N2, N1+N3, and N2+N3 if it requests measurement gaps in 2 component carriers. In an example, the UE 200 may request one or more measurement gaps associated with one or more component carriers and determine an order or ranked list based on the number of PRSs available in different combinations of the measurement gaps. The UE 200 may request measurement gaps based on the ordered list. In an embodiment, the UE 200 may request the measurement gaps from a serving gNB via RRC messaging, and the gNB may be configured to provide the request to other stations. In an embodiment, the UE 200 may utilize other network protocols such as LPP to request measurement gap configuration from a network server such as the LMF 120.

The UE 200 may utilize the PRSs in one or more of many different techniques to determine a position. For example, known position-determination techniques include RSTD, RTT, multi-RTT, OTDOA (also called TDOA), Enhanced Cell Identification (E-CID), DL-AoD, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

Figure 13:
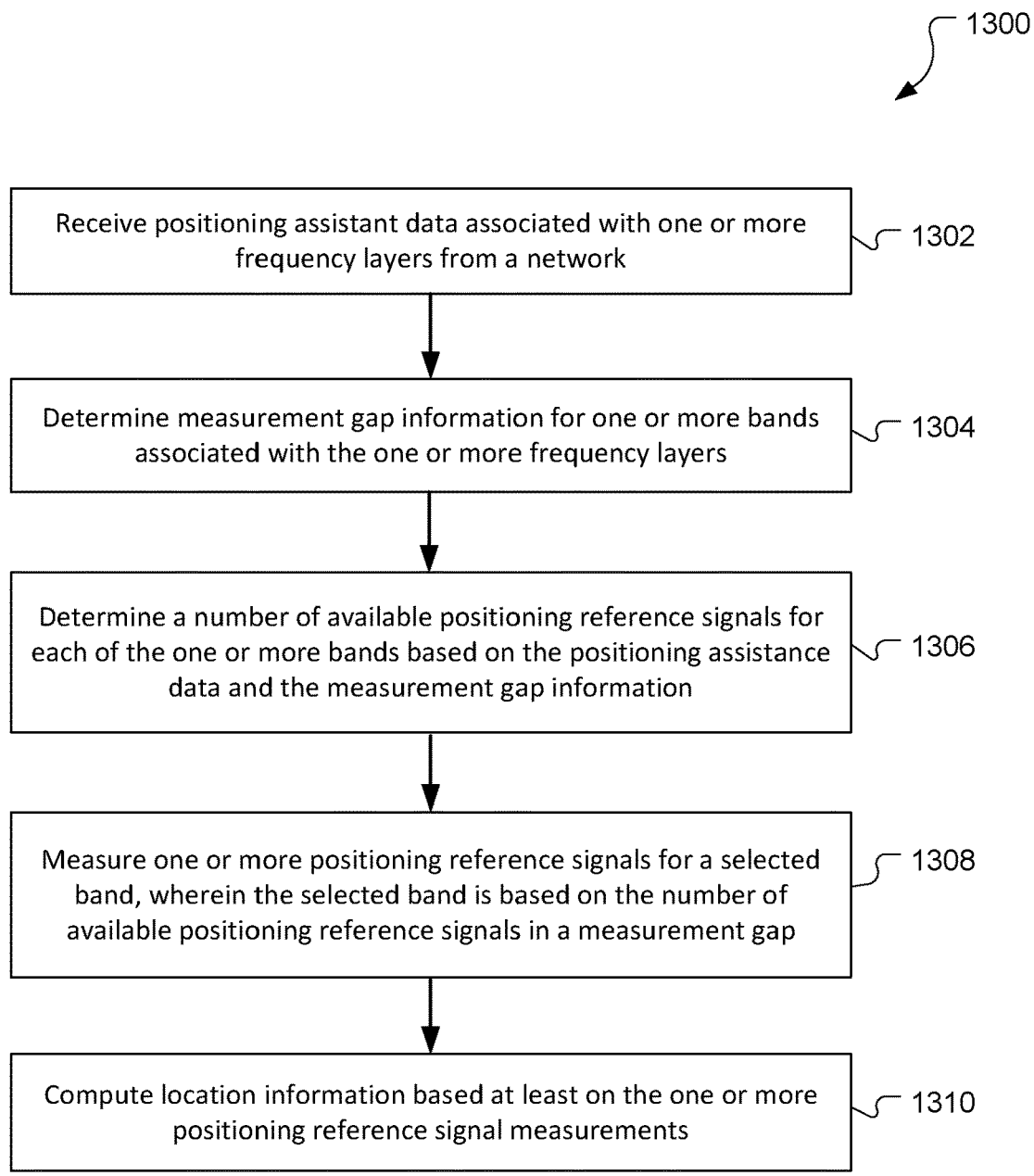
FIG. 13 is a process flow for an example method for selecting bands to maximize positioning reference signal measurements in tuneless measurement gaps.

Referring to FIG. 13, with further reference to FIGS. 1-12, a method 1300 for selecting bands to maximize positioning reference signal measurements in tuneless measurement gaps includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving positioning assistance data associated with one or more frequency layers from a network. The UE 200 is a means for receiving the positioning assistance data. The positioning assistance data may include PRS configuration information associated with one or more TRPs and may include positioning frequency layers, PRS resources, PRS resource sets, and other positioning assistance data configured to enable the UE 200 to receive and utilize positioning reference signals to determine a location. The positioning assistance data may be included in System Information Blocks (SIBs), received via RRC signaling, or received via other messaging protocols. The positioning assistance data may include PRS transmission timing information for PRS beams on the different frequency layers that may be received by the UE 200.

At stage 1304, the method includes determining measurement gap information for one or more bands associated with the one or more frequency layers. The UE 200 is a means for determining the measurement gap information. In an example, a TRP 300 may be configured to transmit measurement gap configuration information in RRC signaling or other over-the-air messaging. The measurement gap information may include information elements such as the MGO 704, MGL 706 and MGRP 708. In an example, a gap pattern identification (e.g., 0-23) may be used to denote previously stored MGL and MGRP values. The measurement gaps may be different on different frequency layers. Alternatively, a single measurement gap pattern can be configured for different frequency layers (e.g., FR1 and FR2). The one or more bands may include the entire frequency layer, a component carrier or a collection of component carriers.

At stage 1306, the method includes determining a number of available positioning reference signals for each of the one or more bands based on the positioning assistance data and the measurement gap information. The UE 200 is a means for determining a number of available positioning reference signals. The UE 200 may compare the schedule of PRS transmissions for various TRPs, PRS resources, PRS resource sets, with the measurement gap information to determine a number of available PRS transmissions that may be measured. The comparison may include both tune on and tuneless measurement gaps based on the capabilities of the UE 200 and/or the network. For example, referring to FIG. 11 the UE 200 may have one tuneless measurement gap associated with an active BWP and one or more tune on measurement gaps 1110 associated with other component carriers. In another example, referring to FIG. 12, the UE 200 may be able to utilize more than one tuneless measurement gap. For both the tune on and tuneless measurement gaps, the UE 200 determines the number of PRS that may be measured during the measurement gap. In an example, the UE 200 may be configured to select a band so as to maximize the number of positioning reference signal that may be measured in one or more component carriers in the measurement gap, and the number of positioning reference signals that may be measured may include those in an actual gap less any tune in or tune out period.

At stage 1308, the method includes measuring one or more positioning reference signals for a selected band, wherein the selected band is based on the number of available positioning reference signals in a measurement gap. The UE 200 is a means for measuring the one or more positioning reference signals. The UE 200 may be configured to request the measurement gaps based on the number of available PRS measurements. For example, referring to FIG. 13, the UE may request measurement gaps based on the maximum of N1, N2 and N3, or on combinations of the N values (e.g., max(N1+N2, N1+N3, N2+N3)). Referring to FIG. 11, the UE 200 may determine the number of PRS available in the actual gap portion of a tune on gap. For example, the first band 1102 has a number of available positioning reference signals equal to 4 (i.e., N1=4). In an example, the UE 200 may request one or more measurement gaps associated with one or more component carriers and determine an order or ranked list based on the number of PRSs available in different combinations of the measurement gaps. In an embodiment, the UE 200 may utilize network signaling such as RRC or DCI to request the measurement gaps. The UE 200 may perform PRS measurements based on the ordered list of measurement gaps. In an example, the band may include a set of component carriers and the UE 200 may perform PRS measurements on one or more of the component carriers in the set of component carriers. In an example, the component carriers may be in different frequency layers.

At stage 1310, the method includes computing location information based at least on the one or more positioning reference signal measurements. The UE 200 is a means for computing the location information. In an example, the UE 200 may utilize the PRSs in one or more known position-determination techniques include RSTD, RTT, multi-RTT, OTDOA, E-CID, DL-AOD, etc. The UE 200 may utilize positioning assistance data, such as station location information, to compute an estimated position. In an example, the UE 200 may provide the PRS measurement results to a serving station, and a network resource such as the LMF 120 may be configure to compute the location information.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising." "includes," and/or "including." as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for positioning a user equipment, comprising:
   receiving positioning assistance data associated with one or more frequency layers from a network:
   determining measurement gap information for one or more bands associated with the one or more frequency layers:
   determining a number of available positioning reference signals for each of the one or more bands based on the positioning assistance data and the measurement gap information:
   measuring one or more positioning reference signals for a selected band, wherein the selected band is based on the number of available positioning reference signals in a measurement gap; and
   computing location information based at least in part on one or more positioning reference signal measurements.

2. The method of clause 1 wherein determining the measurement gap information includes determining a tune in duration and a tune out duration for the measurement gap.

3. The method of clause 2 wherein the selected band is a band to which the user equipment does not need to tune in or tune out whereby the measurement gap is a tuneless measurement gap and the tune in duration and the tune out duration are zero.

4. The method of clause 1 wherein at least one of the one or more bands is associated with an active bandwidth part on the user equipment.

5. The method of clause 1 wherein the one or more bands includes a first component carrier in a first band and a second component carrier in a second band.

6. The method of clause 5 wherein the first band and the second band are in a first frequency layer.

7. The method of clause 5 wherein the first band is in a first frequency layer and the second band is in a second frequency layer.

8. The method of clause 1 wherein the one or more bands includes a first component carrier and a second component carrier in a first band.

9. The method of clause 8 wherein the selected band is determined so as to maximize a number of positioning reference signals that may be measured in one or more component carriers in the measurement gap.

10. The method of clause 9 wherein the number of positioning reference signals that may be measured comprises those in an actual gap less any tune in or tune out period for the user equipment.

11. The method of clause 1 wherein the one or more frequency layers includes a first frequency layer in a range of 410-7125 MHz, or a second frequency layer in a range of 24.25-52.6 GHz.

12. The method of clause 1 wherein at least one of the one or more frequency layers is configured to operate in a frequency range above 100 GHz.

13. The method of clause 1 wherein determining the measurement gap information includes requesting the measurement gap information from a base station.

14. The method of clause 1 wherein at least one of the one or more positioning reference signals is a beamformed positioning reference signal.

15. The method of clause 1 wherein the one or more positioning reference signals includes at least two positioning reference signals transmitted in the same frequency layer.

16. The method of clause 1 wherein the one or more positioning reference signals includes a first positioning reference signal transmitted in a first frequency layer and a second positioning reference signal transmitted in a second frequency layer.

17. The method of clause 1 wherein the selected band is based on the number of available positioning reference signals in a combination of measurement gaps in the one or more bands.

18. The method of clause 1 wherein determining the measurement gap information includes requesting the measurement gap information from a base station and receiving the measurement gap information from the base station.

19. The method of clause 18 wherein requesting the measurement gap information is based on radio resource control (RRC) messaging.

20. An apparatus, comprising:
a memory:
at least one transceiver;
at least one processor communicatively coupled to the memory and the at least one processor and configured to:
receive positioning assistance data associated with one or more frequency layers from a network:
determine measurement gap information for one or more bands associated with the one or more frequency layers:
determine a number of available positioning reference signals for each of the one or more bands based on the positioning assistance data and the measurement gap information:
measure one or more positioning reference signals for a selected band, wherein the selected band is based on the number of available positioning reference signals in a measurement gap; and
compute location information based at least in part on one or more positioning reference signal measurements.

21. The apparatus of clause 20 wherein the at least one processor is further configured to determine a tune in duration and a tune out duration for the measurement gap.

22. The apparatus of clause 21 wherein the at least one processor is further configured to select a band which does not need to tune in or tune out whereby the measurement gap is a tuneless measurement gap and the tune in duration and the tune out duration are zero.

23. The apparatus of clause 20 wherein at least one of the one or more bands is associated with an active bandwidth part on the apparatus.

24. The apparatus of clause 20 wherein the one or more bands includes a first component carrier in a first band and a second component carrier in a second band.

25. The apparatus of clause 24 wherein the first band and the second band are in a first frequency layer.

26. The apparatus of clause 24 wherein the first band is in a first frequency layer and the second band is in a second frequency layer.

27. The apparatus of clause 20 wherein the one or more bands includes a first component carrier and a second component carrier in a first band.

28. The apparatus of clause 20 wherein the at least one processor is further configured to select a band so as to maximize a number of positioning reference signals that may be measured in one or more component carriers in the measurement gap.

29. The apparatus of clause 28 wherein the number of positioning reference signals that may be measured comprises those in an actual gap less any tune in or tune out period.

30. The apparatus of clause 20 wherein the one or more frequency layers includes a first frequency layer in a range of 410-7125 MHz, or a second frequency layer in a range of 24.25-52.6 GHz.

31. The apparatus of clause 20 wherein at least one of the one or more frequency layers is configured to operate in a frequency range above 100 GHz.

32. The apparatus of clause 20 wherein the at least one processor is configured to request the measurement gap information from a base station.

33. The apparatus of clause 20 wherein at least one of the one or more positioning reference signals is a beamformed positioning reference signal.

34. The apparatus of clause 20 wherein the one or more positioning reference signals includes at least two positioning reference signals transmitted in the same frequency layer.

35. The apparatus of clause 20 wherein the one or more positioning reference signals includes a first positioning reference signal transmitted in a first frequency layer and a second positioning reference signal transmitted in a second frequency layer.

36. The apparatus of clause 20 wherein the selected band is based on the number of available positioning reference signals in a combination of measurement gaps in the one or more bands.

37. The apparatus of clause 20 wherein the at least one processor is further configured to request the measurement gap information from a base station and receive the measurement gap information from the base station.

38. The apparatus of clause 37 wherein the at least one processor is further configured to request the measurement gap information based on radio resource control (RRC) messaging.

39. An apparatus for positioning a user equipment, comprising:
means for receiving positioning assistance data associated with one or more frequency layers from a network:
means for determining measurement gap information for one or more bands associated with the one or more frequency layers:
means for determining a number of available positioning reference signals for each of the one or more bands based on the positioning assistance data and the measurement gap information:
means for measuring one or more positioning reference signals for a selected band, wherein the selected band is based on the number of available positioning reference signals in a measurement gap; and means for computing location information based at least in part on one or more positioning reference signal measurements.

40. A non-transitory processor-readable storage medium comprising processor-readable instructions configured to cause one or more processors to position a user equipment, comprising:

code for receiving positioning assistance data associated with one or more frequency layers from a network;

code for determining measurement gap information for one or more bands associated with the one or more frequency layers;

code for determining a number of available positioning reference signals for each of the one or more bands based on the positioning assistance data and the measurement gap information;

code for measuring one or more positioning reference signals for a selected band, wherein the selected band is based on the number of available positioning reference signals in a measurement gap; and code for computing location information based at least in part on one or more positioning reference signal measurements.

The invention claimed is:

1. A method for positioning a user equipment, comprising:

receiving, at the user equipment, positioning assistance data associated with one or more frequency layers from a network;

determining, at the user equipment, measurement gap information for one or more bands associated with the one or more frequency layers;

determining, at the user equipment, a number of available positioning reference signals for each of the one or more bands based on the positioning assistance data and the measurement gap information;

measuring, at the user equipment, one or more positioning reference signals for a selected band, wherein the selected band is based on the number of available positioning reference signals in a measurement gap; and computing location information based at least in part on one or more positioning reference signal measurements.

2. The method of claim 1 wherein determining the measurement gap information includes determining a tune in duration and a tune out duration for the measurement gap.

3. The method of claim 2 wherein the selected band is a band to which the user equipment does not need to tune in or tune out whereby the measurement gap is a tuneless measurement gap and the tune in duration and the tune out duration are zero.

4. The method of claim 1 wherein at least one of the one or more bands is associated with an active bandwidth part on the user equipment.

5. The method of claim 1 wherein the one or more bands includes a first component carrier in a first band and a second component carrier in a second band.

6. The method of claim 5 wherein the first band and the second band are in a first frequency layer.

7. The method of claim 5 wherein the first band is in a first frequency layer and the second band is in a second frequency layer.

8. The method of claim 1 wherein the one or more bands includes a first component carrier and a second component carrier in a first band.

9. The method of claim 8 wherein the selected band is determined so as to maximize a measurable number of positioning reference signals in one or more component carriers in the measurement gap.

10. The method of claim 9 wherein the measurable number of positioning reference signals comprises those in an actual gap less any tune in or tune out period for the user equipment.

11. The method of claim 1 wherein the one or more frequency layers includes a first frequency layer in a range of 410-7125 MHz, or a second frequency layer in a range of 24.25-52.6 GHz.

12. The method of claim 1 wherein at least one of the one or more frequency layers is configured to operate in a frequency range above 100 GHz.

13. The method of claim 1 wherein determining the measurement gap information includes requesting the measurement gap information from a base station.

14. The method of claim 1 wherein at least one of the one or more positioning reference signals is a beamformed positioning reference signal.

15. The method of claim 1 wherein the one or more positioning reference signals includes at least two positioning reference signals transmitted in the same frequency layer.

16. The method of claim 1 wherein the one or more positioning reference signals includes a first positioning reference signal transmitted in a first frequency layer and a second positioning reference signal transmitted in a second frequency layer.

17. The method of claim 1 wherein the selected band is based on the number of available positioning reference signals in a combination of measurement gaps in the one or more bands.

18. The method of claim 1 wherein determining the measurement gap information includes requesting the measurement gap information from a base station and receiving the measurement gap information from the base station.

19. The method of claim 18 wherein requesting the measurement gap information is based on radio resource control (RRC) messaging.

20. A user equipment, comprising:
a memory;
at least one transceiver;
at least one processor communicatively coupled to the memory and the at least one processor and configured to:
receive positioning assistance data associated with one or more frequency layers from a network;
determine measurement gap information for one or more bands associated with the one or more frequency layers;
determine a number of available positioning reference signals for each of the one or more bands based on the positioning assistance data and the measurement gap information;
measure one or more positioning reference signals for a selected band, wherein the selected band is based on the number of available positioning reference signals in a measurement gap; and
compute location information based at least in part on one or more positioning reference signal measurements.

21. The user equipment of claim 20 wherein the at least one processor is further configured to determine a tune in duration and a tune out duration for the measurement gap.

22. The user equipment of claim 21 wherein the at least one processor is further configured to select a band which does not need to tune in or tune out whereby the measurement gap is a tuneless measurement gap and the tune in duration and the tune out duration are zero.

23. The user equipment of claim 20 wherein at least one of the one or more bands is associated with an active bandwidth part on the user equipment.

24. The user equipment of claim 20 wherein the one or more bands includes a first component carrier in a first band and a second component carrier in a second band.

25. The user equipment of claim 24 wherein the first band and the second band are in a first frequency layer.

26. The user equipment of claim 24 wherein the first band is in a first frequency layer and the second band is in a second frequency layer.

27. The user equipment of claim 20 wherein the one or more bands includes a first component carrier and a second component carrier in a first band.

28. The user equipment of claim 20 wherein the at least one processor is further configured to select a band so as to maximize a measurable number of positioning reference signals in one or more component carriers in the measurement gap.

29. The user equipment of claim 28 wherein the measurable number of positioning reference signals comprises those in an actual gap less any tune in or tune out period.

30. The user equipment of claim 20 wherein the one or more frequency layers includes a first frequency layer in a range of 410-7125 MHz, or a second frequency layer in a range of 24.25-52.6 GHz.

31. The user equipment of claim 20 wherein at least one of the one or more frequency layers is configured to operate in a frequency range above 100 GHz.

32. The user equipment of claim 20 wherein the at least one processor is configured to request the measurement gap information from a base station.

33. The user equipment of claim 20 wherein at least one of the one or more positioning reference signals is a beamformed positioning reference signal.

34. The user equipment of claim 20 wherein the one or more positioning reference signals includes at least two positioning reference signals transmitted in the same frequency layer.

35. The user equipment of claim 20 wherein the one or more positioning reference signals includes a first positioning reference signal transmitted in a first frequency layer and a second positioning reference signal transmitted in a second frequency layer.

36. The user equipment of claim 20 wherein the selected band is based on the number of available positioning reference signals in a combination of measurement gaps in the one or more bands.

37. The user equipment of claim 20 wherein the at least one processor is further configured to request the measurement gap information from a base station and receive the measurement gap information from the base station.

38. The user equipment of claim 37 wherein the at least one processor is further configured to request the measurement gap information based on radio resource control (RRC) messaging.

39. A user equipment, comprising:
means for receiving positioning assistance data associated with one or more frequency layers from a network;
means for determining measurement gap information for one or more bands associated with the one or more frequency layers;
means for determining a number of available positioning reference signals for each of the one or more bands based on the positioning assistance data and the measurement gap information;
means for measuring one or more positioning reference signals for a selected band, wherein the selected band is based on the number of available positioning reference signals in a measurement gap; and
means for computing location information based at least in part on one or more positioning reference signal measurements.

40. A non-transitory processor-readable storage medium comprising processor-readable instructions configured to cause one or more processors of a user equipment to position the user equipment, comprising code for:
receiving positioning assistance data associated with one or more frequency layers from a network;
determining measurement gap information for one or more bands associated with the one or more frequency layers;
determining a number of available positioning reference signals for each of the one or more bands based on the positioning assistance data and the measurement gap information;
measuring one or more positioning reference signals for a selected band, wherein the selected band is based on the number of available positioning reference signals in a measurement gap; and
computing location information based at least in part on one or more positioning reference signal measurements.

* * * * *